US012652526B2

(12) United States Patent
Li et al.

(10) Patent No.: US 12,652,526 B2
(45) Date of Patent: Jun. 9, 2026

(54) ELECTRONIC DEVICE AND METHOD USED IN WIRELESS COMMUNICATION NETWORK TO EXTEND SIGNAL COVERAGE AND ASSIST COMMUNICATION STABILITY AND RELIABILITY

(71) Applicant: Realtek Semiconductor Corp., HsinChu (TW)

(72) Inventors: Zhaoming Li, Suzhou City (CN); Yidong He, Suzhou City (CN); Mengzhou Shen, Suzhou City (CN)

(73) Assignee: Realtek Semiconductor Corp., HsinChu (TW)

( * ) Notice: Subject to any disclaimer, the term of this patent is extended or adjusted under 35 U.S.C. 154(b) by 142 days.

(21) Appl. No.: 18/795,205

(22) Filed: Aug. 6, 2024

(65) Prior Publication Data

US 2025/0063347 A1 Feb. 20, 2025

(30) Foreign Application Priority Data

Aug. 14, 2023 (CN) .......................... 202311017863.5

(51) Int. Cl.
| | |
|---|---|
| *H04W 12/03* | (2021.01) |
| *H04W 12/037* | (2021.01) |

(52) U.S. Cl.
CPC .................................. *H04W 12/037* (2021.01)

(58) Field of Classification Search
None
See application file for complete search history.

(56) References Cited

U.S. PATENT DOCUMENTS

| | | | | |
|---|---|---|---|---|
| 9,439,240 | B1* | 9/2016 | Shipley | ............... H04W 88/182 |
| 2006/0280138 | A1* | 12/2006 | Nanda | ..................... H04L 69/08 |
| | | | | 370/328 |
| 2016/0301371 | A1* | 10/2016 | Ashworth | ................ H04B 1/40 |
| 2019/0260608 | A1* | 8/2019 | Baboescu | ............ H04W 36/14 |
| 2020/0112543 | A1* | 4/2020 | Weed | ........................ H04L 69/18 |
| 2020/0351648 | A1* | 11/2020 | Fang | ..................... H04W 12/08 |
| 2021/0136587 | A1* | 5/2021 | Ren | ........................... H04L 9/32 |
| 2025/0337422 | A1* | 10/2025 | Tsai | ...................... H03M 1/068 |

FOREIGN PATENT DOCUMENTS

| | | | | |
|---|---|---|---|---|
| CA | 2997611 | A1 * | 3/2016 | ......... H04L 47/2475 |
| CN | 115174413 | A | 10/2022 | |
| CN | 115174653 | A | 10/2022 | |
| CN | 115190563 | A | 10/2022 | |

* cited by examiner

*Primary Examiner* — Amir Mehrmanesh
*Assistant Examiner* — Hassan Saadoun
(74) *Attorney, Agent, or Firm* — Winston Hsu

(57) ABSTRACT

An electronic device used in a wireless communication network is wirelessly coupled between an access point device and a station device, and it comprises a receiver circuit, a decryption circuit, an address swap circuit, an encryption circuit, and a transmitter circuit. The receiver circuit receives a wireless packet. The decryption circuit decrypts the received wireless packet to generate a decrypted wireless packet. The address swap circuit changes information of at least one MAC address recorded in a MAC header of the decrypted wireless packet to generate an address-swapped packet so as to disguise itself as the access point device or the station device. The encryption circuit encrypts the address-swapped packet to generate an encrypted packet. The transmitter circuit sends the encrypted packet into the air.

20 Claims, 6 Drawing Sheets

ELECTRONIC DEVICE AND METHOD USED IN WIRELESS COMMUNICATION NETWORK TO EXTEND SIGNAL COVERAGE AND ASSIST COMMUNICATION STABILITY AND RELIABILITY

CROSS REFERENCE TO RELATED APPLICATIONS

This application claims the benefit of Application No. CN202311017863.5, filed on Aug. 14, 2023.

BACKGROUND OF THE INVENTION

1. Field of the Invention

The invention relates to a wireless communication network, and more particularly to an electronic device and corresponding method capable of being used as a signal booster/extension device.

2. Description of the Prior Art

Generally speaking, nowadays wireless communication networks such as Wifi networks are used everywhere, and most electronic devices can use wireless communication networks for data transmission. However, as the distance between the access point device and the station device in the wireless network increases, the quality of signal transmission will decrease. This results in the inability to transmit data successfully and even causes that the station device is unable to receive the beacon of the wireless access point device and thus will be frequently disconnected from the wireless access point device.

SUMMARY OF THE INVENTION

Therefore one of the objectives of the invention is to provide an electronic device and corresponding method capable of being used as a signal booster/extension device.

According to the embodiments, an electronic device is disclosed and is used in a wireless communication network and is to be wirelessly connected between an access point device and a station device. The electronic device comprises a receiver circuit, a decryption circuit, an address swap circuit, an encryption circuit, and a transmitter circuit. The receiver circuit is used for receiving a wireless packet. The decryption circuit is coupled to the receiver circuit, and is used for performing a decryption operation upon the wireless packet to generate a decoded packet data. The address swap circuit is coupled to the decryption circuit, and is used for swapping at least one medium access control address recorded in a medium access control header of the decoded packet data so as to generate a swapped packet data to make the electronic device disguise itself as the access point device or as the station device. The encryption circuit is coupled to the address swap circuit, and is used for performing an encryption operation upon the swapped packet data to generate an encrypted wireless packet. The transmitter circuit is coupled to the encryption circuit, and is used for transmitting the encrypted wireless packet.

According to the embodiments, an electronic device and method are provided and used for signal booster of WiFi wireless communication signal network based on the medium access control address swapping, so as to extend the signal coverage to assist the communication stability and reliability between the long-distance access point device and the station device.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing an electronic device and a method used in a wireless communication network such as a wireless WiFi network. The electronic device can be used as a signal booster device. The signal booster device may be regarded as a signal extension device or a relay data transfer device to improve the communication quality of a wireless access point (AP) device and at least one station device by using one or more signal booster devices in the wireless communication network when the distance between the wireless AP device and the at least one station device is longer. It should be noted that, in the embodiments of the invention, when the electronic device is used as a signal booster device for data transferring, the electronic device is used to disguise itself as an access point device for a station device, and it is used to disguise itself as a station device for an access point device, so that both of an access point device and a station device merely perceive that they transmit data from each other and do not know that they are communicating through the signal booster device (i.e., the provided electronic device).

Figure 1:
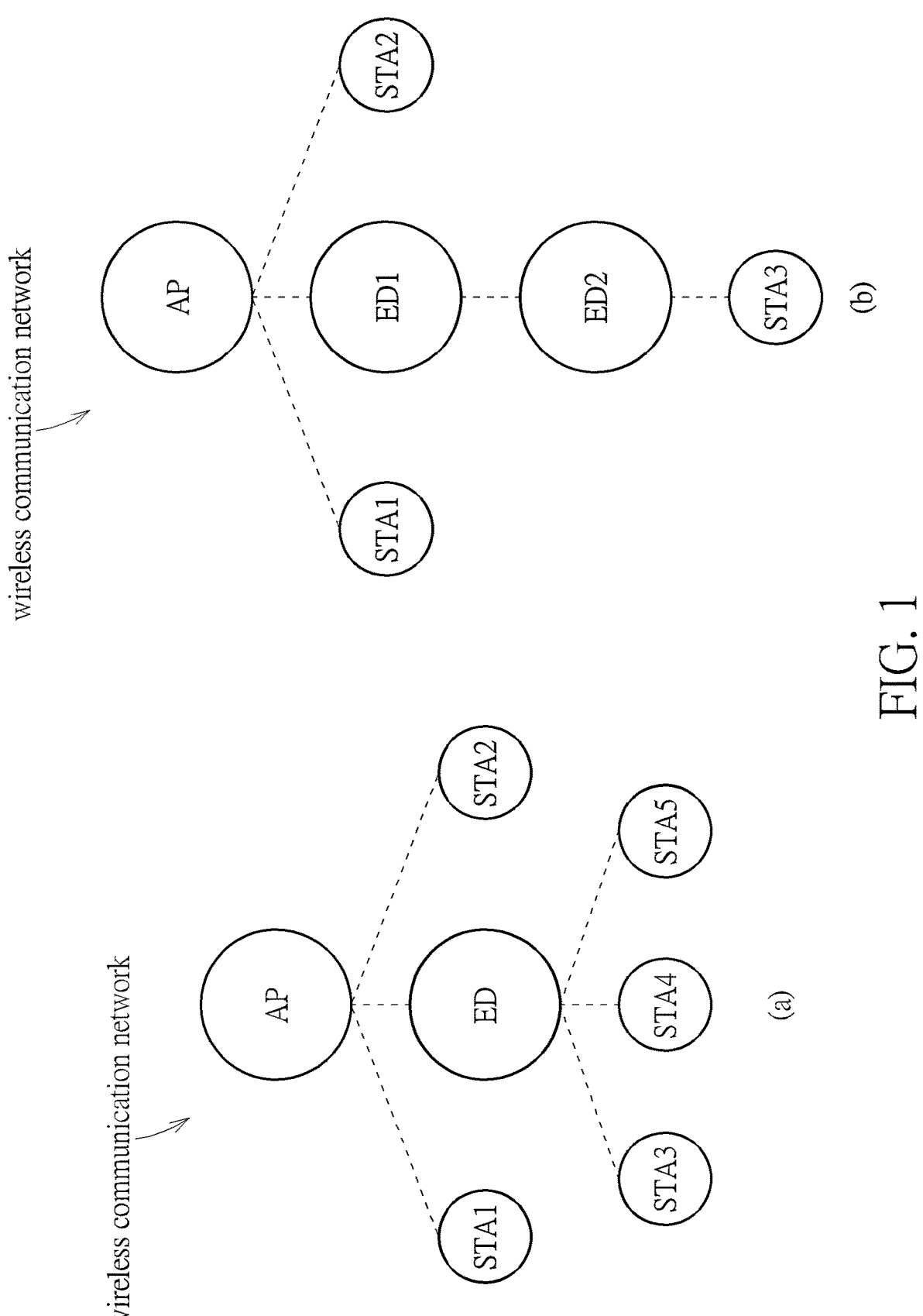
FIG. 1 is a schematic diagram of the signal nodes in a wireless communication network according to an embodiment of the invention.

Please refer to FIG. 1. FIG. 1 is a schematic diagram of the signal nodes in a wireless communication network according to an embodiment of the invention. For example, as shown in the part (a) of FIG. 1, a wireless communication network includes an access point device AP, an electronic device ED, and the station devices STA1-STA5; the relative positions of these devices are shown in FIG. 1. For example, the station devices STA1 and STA2 are close to the access point device AP, and thus they can directly communicate with the access point device AP to for example perform packet/data transmission and/or reception. The station devices STA3, STA4, STA5 are far from the access point devices AP, and in this situation the electronic device ED (used as the signal booster device) in the invention can be used to boost/enhance or extend the coverage of the access point device AP. For example, the electronic device ED can use the same identification name ID (which is identical to that of the access point device AP) such as SSID (Service Set Identifier) (but not limited) to disguise itself as the access point device AP to communicate with the station devices STA3, STA4, STA5. In addition, the electronic device ED, which is used as the signal booster device, can also use the same medium access control (MAC) address (which is identical to that of a station device such as STA4) to disguise itself as the station device STA4 to communicate with the access point device AP. Since neither the access point device AP nor the station device STA4 perceives the existence of the electronic device ED, the access point device AP and the station device STA4 only know that they are communicating with each other. In this way, it is not required to further add/implement complex circuit designs into the hardware elements of the access point device AP and the station device STA4, and only the circuit operations and functions of the electronic device ED used as an intermediate role is needed to be correspondingly designed. By doing so, the invention can achieve the signal boosting effect, extend the communication distance between station device(s) and access point device(s), and at the same time reduces the design complexity for the entire wireless communication network.

Further, for example, as shown in the part (b) of FIG. 1, in a wireless communication network, two or more electronic devices can be used as the signal booster devices to further extend the coverage range of the access point device AP. The wireless communication network as shown in part (b) includes an access point device AP, two electronic devices ED1, ED2, and station devices STA1-STA3; the relative positions of these devices as shown in FIG. 1. For example, even though the station device STA3 is far from the access point device AP, the station device STA3 still can communicate with the access point device AP through the data transmission and/or reception of two electronic devices ED1 and ED2 to achieve data transmission and/or reception between the access point device AP and station device STA3. In this embodiment, as shown in part (b) of FIG. 1, the electronic device ED1 being used as the signal booster device can disguise itself as the access point device AP to communicate with the electronic device ED2 being used as another signal booster device, and the electronic device ED2 can disguise itself as the electronic device ED1 (in other words the electronic device ED2 also disguise itself as the access point device AP) to communicate with the station device STA3. Similarly, the electronic device ED2 can disguise itself as the station device STA3 to communicate with the electronic device ED1, and then the electronic device ED1 can disguise itself as the electronic device ED2 (in other words the electronic device ED1 also disguises itself as the station device STA3) to communicate with the access point device AP.

In other words, the electronic devices ED1 and ED2, which are used as signal booster devices, can also use the same MAC address (identical to the MAC address of station device STA3) to disguise themselves as the station device STA3 to communicate with the access point device AP, and can also use the identification name ID of the access point device AP to disguise themselves as the access point device AP to communicate with the station device STA3. Neither the access point device AP nor the station device STA3 perceives that the data transferring of electronic devices ED1 and ED2, and thus the access point device AP and station device STA3 merely know and think that they are communicating with each other. In this way, it is not needed to add additional circuit designs into the hardware elements of the access point device AP and station device STA3 since only the circuit operations and functions of electronic devices ED1 and ED2 used as intermediate roles are needed to be correspondingly designed. By doing so, this achieves the signal boosting/enhancement effect, extends the communication distance between station device(s) and access point device(s), and also reduces the design complexity of the entire wireless communication network at the same time.

In a traditional wireless communication network architecture, for a relay communication transmission of a packet, it needs to report the packet to an upper layer (such as the software layer) of a traditional relay device for software processing. In addition, the traditional relay device has to provide complete wireless access point functions, such as Dynamic Host Configuration Protocol (DHCP) request and other services. Compared to the traditional wireless communication network architecture, the provided electronic device in the wireless communication network in the invention is arranged to disguise itself as a wireless access point and as a station device when transferring packets, so the wireless access point will not perceive that the provided electronic device is used for forwarding/transferring packets (i.e., does not perceive the existence of the provided electronic device for data transferring). Thus, it is not necessary to report the packets to the upper layer for software processing so as to significantly improve the efficiency of packet forwarding.

Figure 2:
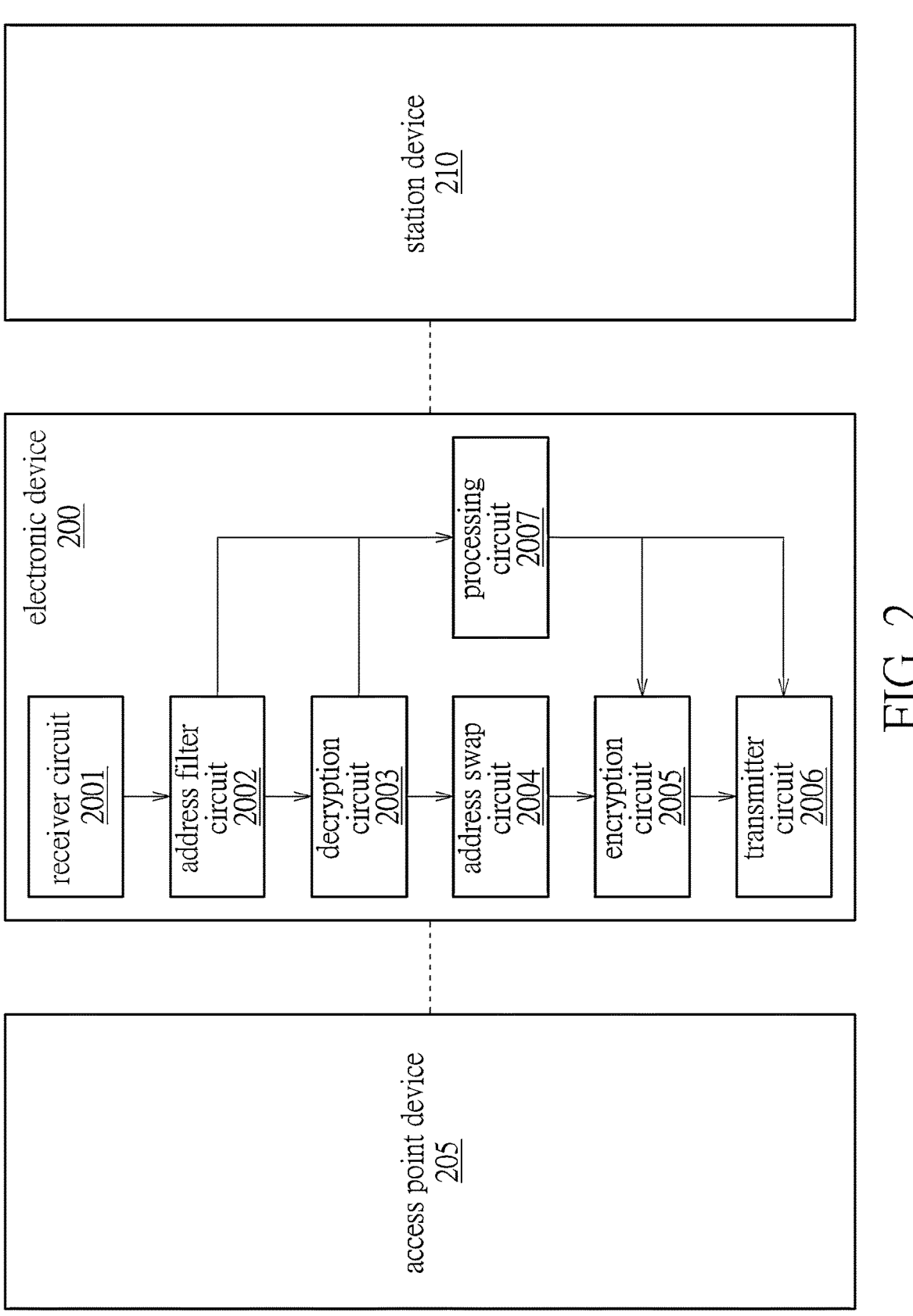
FIG. 2 is a circuit diagram of an electronic device in a wireless communication network according to an embodiment of the invention.

FIG. 2 is a circuit diagram of an electronic device 200 in a wireless communication network according to an embodiment of the invention. As shown in FIG. 2, the electronic device 200, used as a signal booster device, is disposed between an access point device 205 and a station device 210 in a wireless communication network. The electronic device 200 comprises a receiver circuit 2001, an address filter circuit 2002, a decryption circuit 2003, an address swap circuit 2004, an encryption circuit 2005, a transmitter circuit 2006, and a processing circuit 2007. The receiver circuit 2001 is used for receiving a wireless packet. The address filter circuit 2002 is coupled to the receiver circuit 2001 and used for receiving wireless packets transmitted by the access point device 205 and station device 210. The decryption circuit 2003 is coupled to the address filter circuit 2002 and used for performing a decryption upon a received wireless encrypted packet to generate a decoded packet data. The decryption circuit 2003 can be arranged to perform decryption operations upon multiple wireless encrypted packets transmitted by multiple station devices 210 and the access point device 205. In another embodiment, the address filter circuit 2002 may be optional; that is, a wireless packet received by the receiver circuit 2001 can be directly transmitted into the decryption circuit 2003.

The address swap circuit 2004 is coupled to the decryption circuit 2003 and used for swapping at least one MAC address recorded in a MAC header of the decoded packet data to generate a swapped packet data, to make the electronic device 200 disguise itself as the access point device 205 or as the station device 210. For example, the address swap circuit 2004 swaps/replaces the BSSID (it is generally also the RA address) included in an uplink wireless encrypted packet (e.g., an uplink data packet) into/with the MAC address of the access point device 205, and swaps the BSSID information (it is generally also the TA address information) included in a downlink wireless encrypted packet (e.g., a downlink data packet) into the MAC address of the electronic device 200. The encryption circuit 2005 is coupled to the address swap circuit 2004 and is used to perform an encryption operation upon the swapped packet data to encrypt the swapped packet data to generate a re-encrypted wireless encrypted packet. The encryption circuit 2005 can encrypt packet data transmitted from multiple station devices and access point devices. The transmitter circuit 2006 is coupled to the encryption circuit 2005 and used to transmit the re-encrypted wireless encrypted packet. The processing circuit 2007 is coupled to the address filter circuit 2002, the decryption circuit 2003, the encryption circuit 2005, and the transmitter circuit 2006, and it is capable of performing additional logical processing operation(s) such as key installation and the like.

Figure 3:
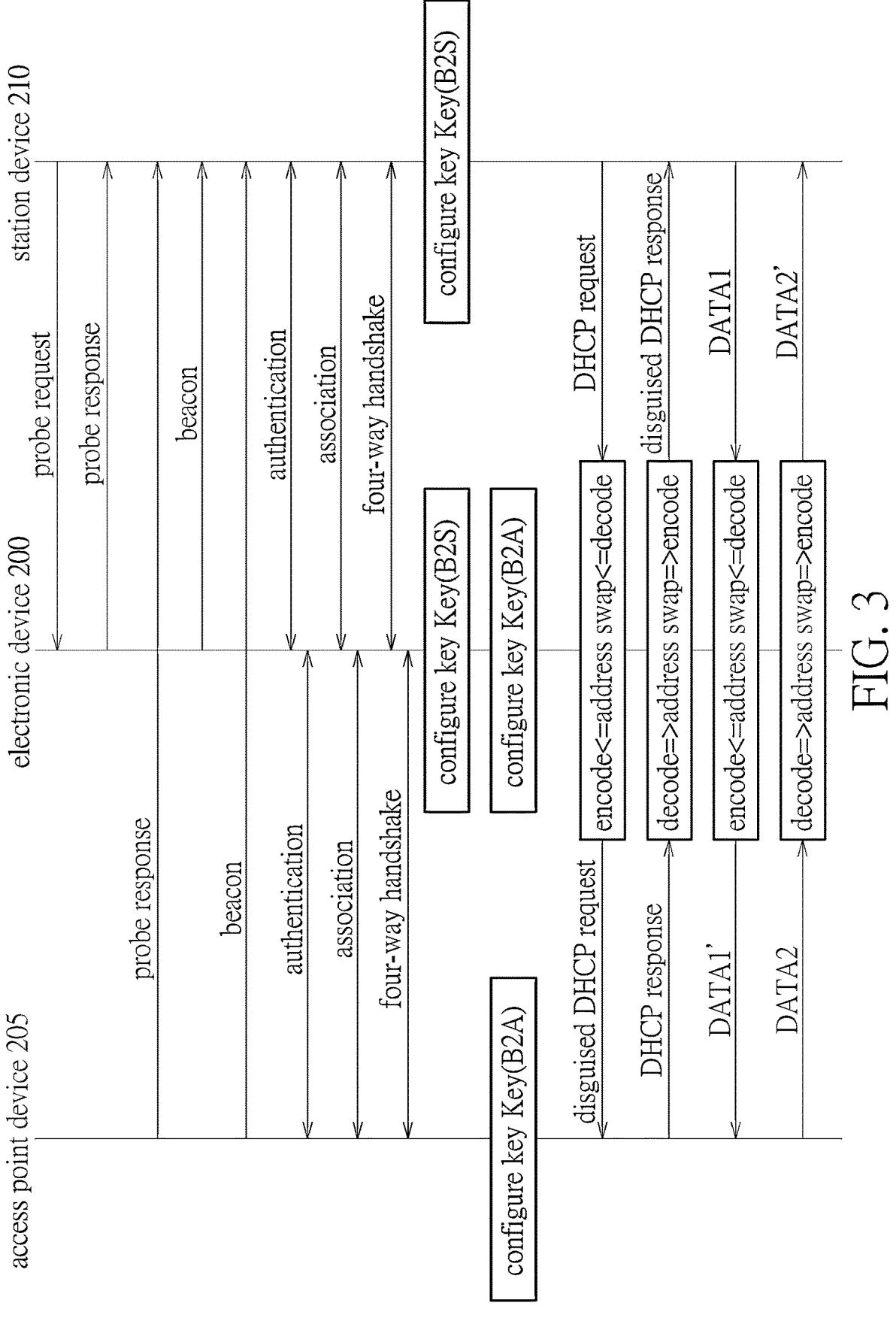
FIG. 3 is a schematic diagram of a flow example of the operations of the electronic device according to an embodiment of the present invention.

FIG. 3 is a schematic diagram of a flow example of the operations of the electronic device 200 according to an embodiment of the present invention. FIG. 3 can be used and applied into the wireless communication network shown in FIG. 1; however, this is not intended to be a limitation. As shown in FIG. 3, at first, a station device 210 scans an access point devices 205 which may have a designated identification name ID. The identification name ID in the wireless communication network is, for example, the service set ID (SSID) of the access point device 205 or a WiFi network name of the access point device 205. The identification name ID may also be, for example, a basic service set ID (BSSID) or the MAC address of the access point device 205. In one embodiment, the station device 210 broadcasts a probe request, and then the station device 210 receives a probe response and/or a beacon from the access point device 205 and/or it receives a probe response and/or a beacon from the electronic device 200.

In this situation, for example, when the communication signal strength of the electronic device 200 is higher than the communication signal strength of the access point device 205, the station device 210 chooses to connect with the electronic device 200 to perform a first wireless network connection procedure/process. At this time, the electronic device 200 pretends to be the access point device 205 to connect with the station device 210, so that the station device 210 only know that it connects to the access point device 205 wirelessly. In the first wireless network connection procedure/process, the electronic device 200 disguises itself as the access point device 205 to perform authentication, association, and four-way handshake with the station device 210 to negotiate and install a first key Key (B2S) used for packets such as data packets and/or management packets.

Almost at the same time, when the electronic device 200 obtains the MAC address of the station device 210, it can disguise itself as the station device 210 by using the transmitted MAC address of the station device 210 to perform a wireless connection with the access point device 205 to perform a second wireless network connection procedure/process, and the access point device 205 merely knows that is wirelessly connects to the station device 210. In the second wireless network connection procedure/process, the electronic device 200 disguises itself as the station device 210 to perform authentication, association connection, and four-way handshake with the access point device 205 to negotiate and install a second key Key (B2A) needed and used for subsequent data and management packets.

After setting and installing the first key Key (B2S) and the second key Key (B2A), the electronic device 200 can forward and transmit uplink packets and/or downlink packets between the station device 210 and the access point device 205. For example (but not limited), during the procedure/process of control signal and data forwarding, when receiving a Dynamic Host Configuration Protocol (DHCP) request sent from the station device 210, the electronic device 200 is arranged to decode the DHCP request and swap (or replace) the MAC address in the decoded DHCP request to disguise itself as another device. Thus, then the electronic device 200 encode the decoded and swapped DHCP request according to the swapped MAC address to generate a disguised DHCP request and transmit the disguised DHCP request into the access point device 205. Then, when receiving a DHCP response sent by the access point device 205, the electronic device 200 is arranged to decode the DHCP response and swap (or replace) the MAC address in the decoded DHCP response to disguise itself as another device. Thus, then, the electronic device 200 encodes the decoded and swapped DHCP response according to the swapped MAC address to generate a disguised DHCP response and transmit the disguised DHCP response into the station device 210. Similarly, when receiving an uplink data packet DATA1 transmitted by the station device 210, the electronic device 200 is arranged to decode the uplink data packet DATA1 and swap the MAC address in the uplink data packet DATA1 to disguise itself as another device. Then, the electronic device 200 encodes the decoded and swapped uplink data packet DATA1 according to the swapped/camouflaged MAC address to generate a disguised/camouflaged uplink data packet DATA1', and then sends the disguised/camouflaged uplink data packet DATA1' to the access point device 205. When receiving a downlink data packet DATA2 transmitted by the access point device 205, the electronic device 200 decodes the downlink data packet DATA2 and swaps the MAC address in the decoded downlink data packet DATA2 for masquerading. Then, the electronic device 200 encodes the decoded and swapped downlink data packet DATA2 according to the swapped MAC address to generate a camouflaged downlink data packet DATA2', and transmits the camouflaged downlink data packet DATA2' to the station device 210. It should be noted that the above example associated with data packets is merely used to illustrate the implementation of the present invention, and other modifications can be applied into management packet(s); this is not intended to be a limitation of the invention.

Figure 4:
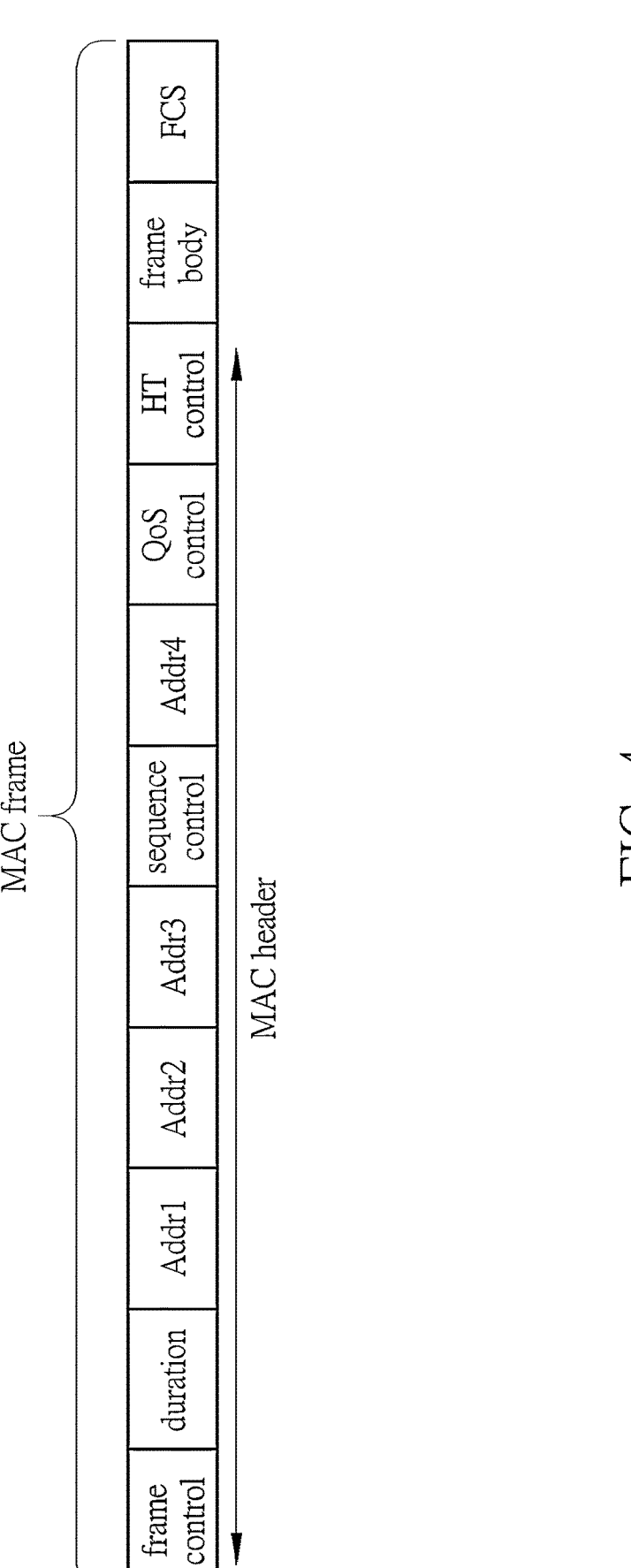
FIG. 4 is a schematic diagram of the format of a MAC frame in a wireless packet for address swapping according to an embodiment of the present invention.

FIG. 4 is a schematic diagram of the format of a MAC frame in a wireless packet (such as a wireless data packet or a wireless management packet; but not limited) for address swapping according to an embodiment of the present invention. As shown in FIG. 4, the MAC frame includes a MAC header, a variable-length frame body, and a frame check sequence (FCS). The MAC header includes multiple fields such as a frame control field, a duration/ID field, a first address field Addr1, a second address field Addr2, a third address field Addr3, a sequence control field, a fourth address field Addr4, a QoS control (quality of service control) field, and an HT control field, and so on. The above address fields for example can be used to indicate information about the wireless packet (such as a wireless data packet), e.g., the information indicating an identification name (such as a basic service set ID (BSSID), a source address (SA), a destination address (DA), a transmitter address (TA), and a receiver address (RA). Depending on the different frame types, different address fields can be used to record different addresses. The destination address DA can be an individual address or a broadcast address, or it can be the final destination address of the MAC frame. The source address SA can be the address of a station that generates the MAC frame. The transmitter address TA refers to the address used to transmit the MAC frame on the wireless medium, and the receiver address RA refers to the address used to receive the MAC frame on the wireless medium. Some frame types do not use all fields. The electronic device 200 can swap/change the address(es) recorded in at least one address field in the MAC frame to disguise it as a station device or an access point device. In an embodiment, the wireless packet may also be a wireless management packet of a management frame, and the electronic device 200 may replace the address(es) recorded in at least one address field in the wireless management packet to disguise it as a station device or an access point device.

Figure 5:
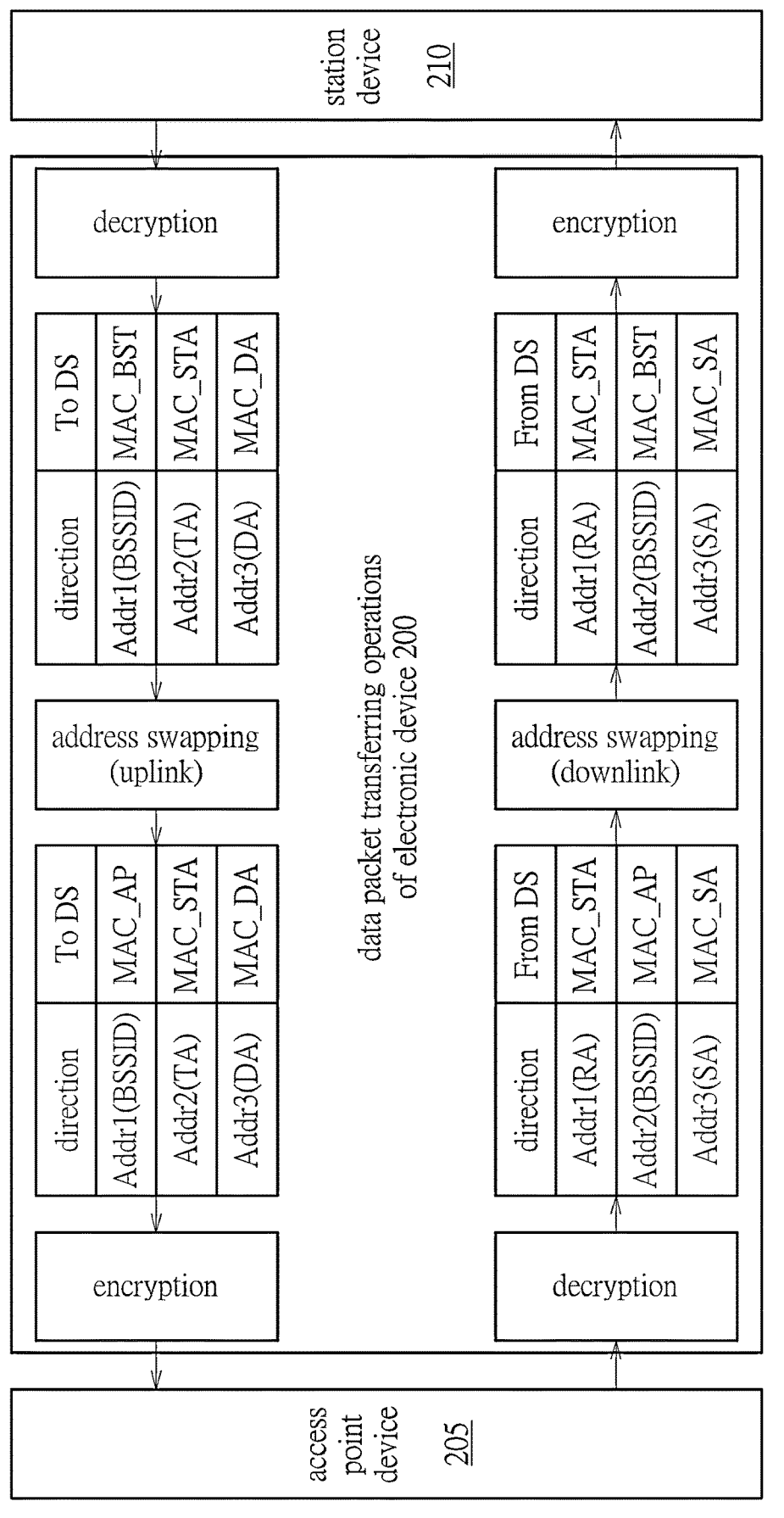
FIG. 5 is a schematic diagram of an example of the operations of the electronic device for uplink and/or downlink data packet transferring according to an embodiment of the present invention.

FIG. 5 is a schematic diagram of an example of the operations of the electronic device 200 for uplink and/or downlink data packet transferring according to an embodiment of the present invention. As shown in FIG. 5, after the electronic device 200 has been disguised as the access point device 205, for example, when the signal strength of the electronic device 200 is higher than the signal strength of the access point device 205, the station device 210 can send an uplink wireless data packet to the electronic device 200 and does not transmit the uplink wireless data packet to the access point device 205. In this situation, the uplink wireless data packet records that its transmission direction is "To DS", for example transmitting to an access point device in a distributed system. In addition, the MAC header of the uplink wireless data packet may use the first address field Addr1 to record the BSSID, and for example what is recorded at this time is the MAC address MAC BST of the electronic device 200. The MAC header of the uplink wireless data packet may use the second address field Addr2 to record the transmitter address TA. For example, what is recorded at this time is the MAC address MAC STA of the station device 210. The MAC header of the uplink wireless data packet may use the third address field Addr3 to record the destination address DA. For example, what is recorded at this time is a destination address MAC DA.

When the electronic device 200 (for example the receiver circuit 2001 and/or the address filter circuit 2002) receives the uplink wireless data packet, the electronic device 200 (for example the decryption circuit 2003) will use the first key Key (B2S), negotiated with the station device 210, to decrypt the uplink wireless data packet. After completing the decryption, the electronic device 200 (for example the address swap circuit 2004) modifies the information of BSSID recorded in the first address field Addr1 in the decoded packet data as the MAC address of the access point device 205 (i.e., MAC AP). In this situation, the previously recorded BSSID is also the receiver address RA (but not limited to); information of other address fields will not be changed.

Next, the electronic device 200 (for example the encryption circuit 2005) uses the second key Key (B2A), negotiated with the access point device 205, to re-encrypt the t decrypted and address-swapped packet data to generate a re-encrypted packet. The electronic device 200 (for example the transmitter circuit 2006) transmits the re-encrypted packet. In this way, after the access point device 205 receives the re-encrypted packet, the access point device 205 may obtain that the information of BSSID records value of the MAC address of the access point device 205 and the transmitter address TA (it is generally also the source address SA (but not limited to)) is the MAC address of the station device 210. Therefore, the access point device 205 may determine that this packet is an uplink wireless data packet sent from the station device 210. Then, the access point device 205 uses the second key Key (B2A), negotiated with the electronic device 200 which disguises itself as the station device 210, to decrypt the re-encrypted wireless data packet to obtain data of the wireless data packet sent from the station device 210.

Further, for the transmission of downlink data packets, refer to FIG. 5. After the electronic device 200 has disguised itself as the access point device 205, the access point device 205 transmits a downlink wireless data packet or broadcasts a downlink wireless data packet, and in this situation the receiver address RA (usually the destination address DA (but not limited to)) used to transmit or broadcast the packet is equal to the MAC address MAC STA of station device 210 or equal to a broadcast MAC address. Since the station device 210 is connected to the electronic device 200, the downlink wireless data packet is received by the electronic device 200, and the station device 210 does not respond to the transmission of the downlink wireless data packet. In this situation, the downlink wireless data packet records that its transmission direction is "From DS"; for example, downlink wireless data packet is transmitted from an access point device in a distributed system. In addition, the MAC header of the downlink wireless data packet may use the first address field Addr1 to record a receiver address RA, and for example what is recorded at this time is the MAC address MAC STA of the station device 210. The MAC header of the downlink wireless data packet may use the second address field Addr2 to record a BSSID, and for example what is recorded at this time is the MAC address MAC AP of the access point device 205. The MAC header of the downlink wireless data packet may use the third address field Addr3 to record a source address SA, and for example what is recorded at this time is a source address MAC SA.

When the electronic device 200 (for example the receiver circuit 2001 and/or the address filter circuit 2002) receives the downlink wireless data packet, the electronic device 200 (for example the decryption circuit 2003) uses the second key Key (B2A), negotiated with the access point device 205, to decrypt the downlink wireless data packet. Then, after completing the decryption, the electronic device 200 (for example the address swap circuit 2004) modifies the BSSID recorded in the second address field Addr2 in the decoded packet data as the MAC address of the electronic device 200 (that is, MAC BST), and other data in other address fields will not be changed.

Next, the electronic device 200 (e.g., the encryption circuit 2005) uses the first key Key (B2S), negotiated with the station device 210, to re-encrypt the decrypted and address-swapped packet data to generate a re-encrypted packet. The electronic device 200 (for example the transmitter circuit 2006) transmits the re-encrypted packet. In this way, when the station device 210 receives the re-encrypted packet, the station device 210 can find that the receiver address RA is the MAC address MAC STA of station device 210 and the recorded BSSID is the MAC address of electronic device 200. Therefore, the station device 210 can determine that this is a downlink wireless data packet sent from electronic device 200 (which disguises itself as the access point device 205 at this time). Then, the station device 210 may use the first key Key (B2S), negotiated with the electronic device 200 (for example the decryption circuit 2003), to decrypt the re-encrypted wireless data packet so as to obtain the data of the wireless data packet from the access point device 205.

Figure 6:
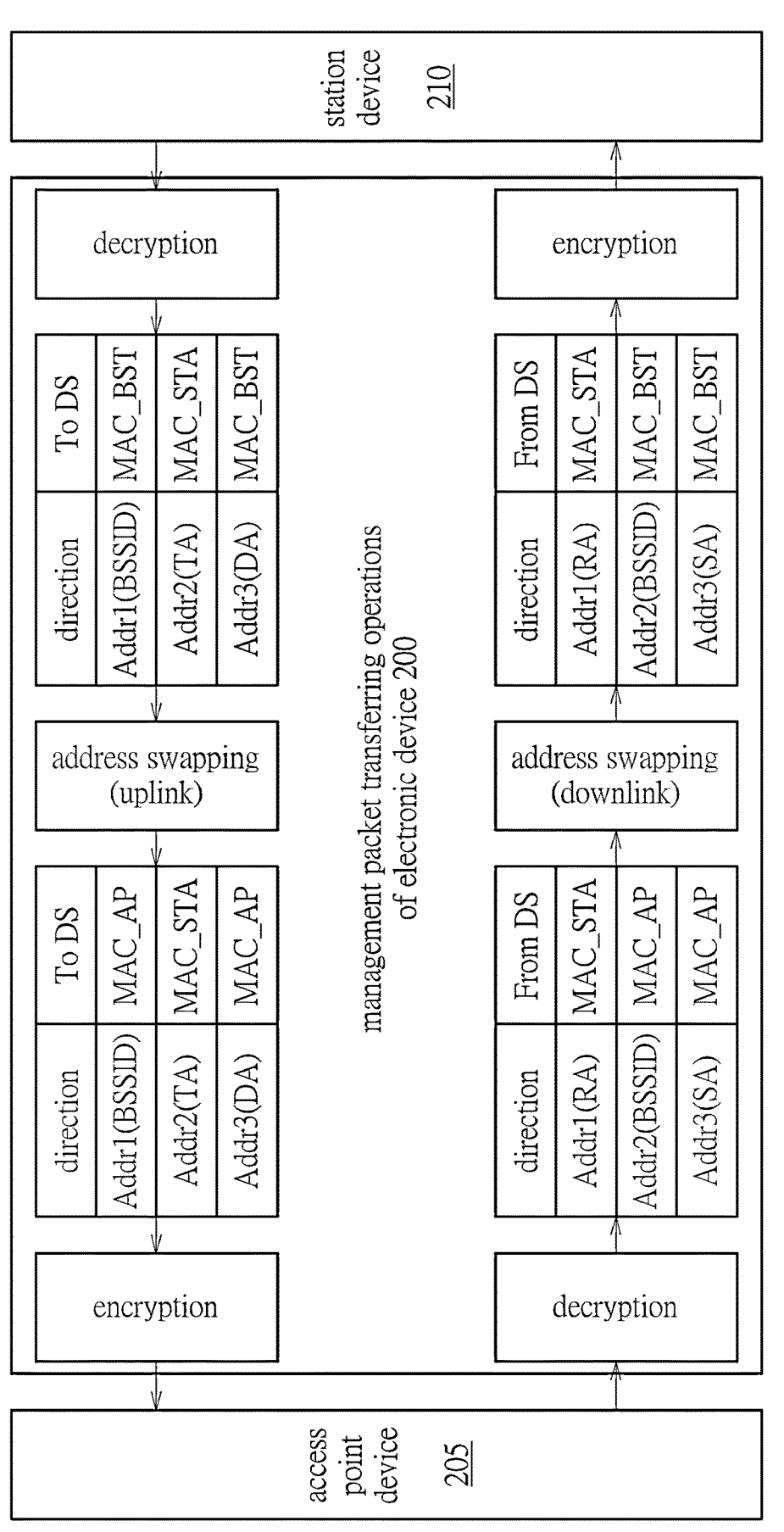
FIG. 6 is a schematic diagram of the operations of the electronic device transferring/transmitting uplink and/or downlink management packets according to an embodiment of the present invention.

FIG. 6 is a schematic diagram of the operations of the electronic device 200 transferring/transmitting uplink and/or downlink management packets according to an embodiment of the present invention. As shown in FIG. 6, after the electronic device 200 has disguised itself as the access point device 205, for example, when the signal strength of the electronic device 200 is higher than the signal strength of the access point device 205, the station device 210 can send an uplink wireless management packet to the electronic device 200, without sending the uplink wireless management packet to the access point device 105. In this situation, the uplink wireless management packet may record that its transmission direction is "To DS", e.g., to an access point device in a distributed system. In addition, the MAC header of the uplink wireless management packet may use the first address field Addr1 to record the BSSID, and for example what is recorded at this time is the MAC address MAC BST of the electronic device 200. The MAC header of the uplink wireless management packet may use the second address field Addr2 to record the transmitter address TA, and for example what is recorded at this time is the MAC address MAC STA of the station device 210. The MAC header of the uplink wireless management packet may use the third address field Addr3 to record the destination address DA, and for example what is recorded at this time is the MAC address MAC BST of electronic device 200 since the electronic device 200 has disguised itself as the access point device 205 and thus the station device 210 determines that a device which the station device 210 is currently connected to is the access point device 205).

When the electronic device 200 (for example the receiver circuit 2001 and/or the address filter circuit 2002) receives the uplink wireless management packet, the electronic device 200 (for example the decryption circuit 2003) may use the first key Key (B2S), negotiated with the station device 210, to decrypt the uplink wireless management packet. After completing the decryption, the electronic device 200 (for example the address swap circuit 2004) modifies the BSSID recorded in the first address field Addr1 in the decrypted packet as the MAC address of the access point device 205 (that is, MAC AP); usually, the BSSID originally recorded in the first address field Addr1 in this situation is equal to the receiver address RA (but not limited to). Further, the destination address DA recorded in the third address field Addr3 is modified as the MAC address of the access point device 205 (that is, MAC AP). Data in other address fields will not be changed.

Next, the electronic device 200 (for example the encryption circuit 2005) uses the second key Key (B2A), negotiated with the access point device 205, to re-encrypt the decrypted and address-swapped packet data to generate a re-encrypted packet. The electronic device 200 (for example the transmitter circuit 2006) transmits the re-encrypted packet. In this way, when the access point device 205 receives the re-encrypted packet, the access point device 205 can find that the BSSID information and destination address DA recorded in the re-encrypted packet are exactly the MAC address of the access point device 205, and the transmitter address TA (usually also the source address SA (but not limited to)) is the MAC address of the station device 210. Therefore, the access point device 205 can determine that this is an uplink wireless management packet from the station device 210. Then, the access point device 205 may use the second key Key (B2A), negotiated with the electronic device 200 which disguised itself as the station device 210, to decrypt the re-encrypted wireless management packet so as to obtain data of the wireless management packet from the station device 210.

Further, for the transmission of downlink management packets, as shown in FIG. 6, after the electronic device 200 has disguised itself as the access point device 205, the access point device 205 transmits a downlink wireless management packet or broadcasts a downlink wireless management packet. In this situation, the receiver address RA (it is usually also the destination address DA; but not limited to) of the packet used to transmit or broadcast is equal to the MAC address MAC STA of the station device 210 or equal to a broadcast MAC address. In this example, the station device 210 is connected to the electronic device 200, and thus the downlink wireless management packet is received by the electronic device 200 while the station device 210 will not respond to the downlink wireless management packet. The downlink wireless management packet may record that its transmission direction is "From DS", and for example it is transmitted from an access point device in a distributed system. In addition, the MAC header of the downlink wireless management packet may use the first address field Addr1 to record a receiver address RA, and for example what is recorded at this time is the MAC address MAC STA of the station device 210. The MAC header of the downlink wireless management packet may use the second address field Addr2 to record BSSID information, and for example what is recorded at this time is the MAC address MAC AP of the access point device 205. The MAC header of the downlink wireless management packet may use the third address field Addr3 to record the information of a source address SA, and for example what is recorded at this time is the MAC address MAC AP of the access point device 205.

When the electronic device 200 (for example the receiver circuit 2001 and/or the address filter circuit 2002) receives the downlink wireless management packet, the electronic device 200 (for example the decryption circuit 2003) will use the second key Key (B2A), negotiated with the access point device 205, to decrypt the downlink wireless management packet. Then, after completing the decryption, the electronic device 200 (for example the address swap circuit 2004) modifies the BSSID recorded in the second address field Addr2 and the source address SA recorded in the third address field Addr3 in the decoded packet data as the MAC address of device 200 (i.e., MAC BST). Data in other address fields will not be changed.

Next, the electronic device 200 (e.g., the encryption circuit 2005) uses the first key Key (B2S), negotiated with the station device 210, to re-encrypt the decrypted and address-swapped packet data to generate a re-encrypted packet. The electronic device 200 (for example, the transmitter circuit 2006) transmits the re-encrypted packet. In this way, when the station device 210 receives the re-encrypted packet, it can find that the receiver address RA is the MAC address MAC STA of the station device 210 and the BSSID and source address SA recorded are equal to the MAC addresses of the electronic device 200. Thus, the station device 210 can determine that this is a downlink wireless management packet sent from the electronic device 200 (which disguised itself as the access point device 205 at this time). Then, the station device 210 may use the first key Key (B2S), negotiated with the electronic device 200 (for example, the decryption circuit 2003), to decrypt the re-encrypted wireless management packet so as to obtain the data of the wireless management packet from the access point device 205.

According to the above operations, in the embodiment of the present invention, for an uplink wireless packet such as an uplink data packet or an uplink management packet, the address swap circuit 2004 is used to swap BSSID of at least one address field in the MAC header in the decoded packet data to modify the originally recorded MAC address MAC BST of electronic device 200 as the MAC address MAC AP of access point device 205 to generate the swapped packet data, wherein the data in other address fields will not be changed. For a downlink wireless packet such as a downlink data packet or a downlink management packet, the address swap circuit 2004 is used to swap and modify the MAC address information MAC AP of the access point device 205 originally recorded in at least one address field in the decoded packet data as the MAC address MAC BST of electronic device 200, and the data in other address fields will not be changed. Through the above two-way decryption operations, address swapping operations and encryption operations, the electronic device 200 can achieve the effect of pretending to be the access point device 205 and the station device 210 at the same time.

Further, it should be noted that, the authentication, associated connection, four-way handshake and other connection operations between the electronic device 200 and the access point device 205 do not need to wait for the connection between the station device 210 and the electronic device 200 to be completed before starting. The connection operations can be also performed simultaneously.

Further, it should be noted that the functions and operations actually possessed by the electronic device 200 may be equivalent to the functions and operations of an access point device. For example, in addition to the aforementioned signal booster/extension function, the electronic device 200 can also have other different functions. For example, it can also serve as a basic station device (in this situation it does not disguise itself as another station device) to connect with an access point device and supports for other mesh connection protocols, etc.

Further, the circuit components included in the electronic device 200 shown in FIG. 2 can be implemented by using pure hardware circuit components, or they can be implemented by using pure software components, or they can also be implemented using components that have both software components and hardware components.

In summary, according to the embodiment of the present invention, the electronic device 200 in a wireless communication network is used to wirelessly connect between the access point device 205 and the station device 210. The electronic device 200 includes a receiver circuit 2001, a decryption circuit 2003, an address swap circuit 2004, an encryption circuit 2005 and a transmitter circuit 2006. The address filter circuit 2002 of FIG. 2 may be optional or may be integrated into the receiver circuit 2001. The receiver circuit 2001 is used to receive a wireless packet. The decryption circuit 2003 is coupled to the receiver circuit 2001 and is used to decrypt the received wireless packet to generate a decoded packet data. The address swap circuit 2004 is coupled to the decryption circuit 2003 and is used to swap at least one MAC address recorded in a MAC header of the decoded packet data to generate a swapped packet data, so that the electronic device 200 can disguise itself as an access point device 205 or a station device. 210. The encryption circuit 2005 is coupled to the address swap circuit 2004 and is used to encrypt the swapped packet data to generate an encrypted wireless packet. The transmitter circuit 2006 is coupled to the encryption circuit 2005 and used to transmit the encrypted wireless packet.

For example, the received wireless packet is an uplink wireless packet, and the address swap circuit 2003 is used to swap a basic service set identification name of the at least one MAC address in the MAC header of the decoded packet data from the recorded the MAC address of electronic device 200 into the MAC address of access point device 205 to generate the swapped packet data. The encryption circuit 2005 encrypts the swapped packet data to generate the encrypted wireless packet. The transmitter circuit 2006 is used to transmit the encrypted wireless packet to the access point device 205. Further, the address swap circuit 2004 can also be used to swap a destination address of at least one MAC address in the MAC header of the decoded packet data from the recorded MAC address of the electronic device 200 into the MAC of the access point device 205 address so as to generate the swapped packet data.

Further, for example, the received wireless packet is a downlink wireless packet, and the address swap circuit 2004 is used to swap a basic service set identification name of the at least one MAC address in the MAC header of the decoded packet data from the recorded the MAC address of access point device 205 into the MAC address of electronic device 200 to generate the swapped packet data. The encryption circuit 2005 encrypts the swapped packet data to generate the encrypted wireless packet, and the transmitter circuit 2006 is used to transmit the encrypted wireless packet to the station device. Further, the address swap circuit 2004 can also be used to swap and replace the source address of the at least one MAC address in the MAC header of the decoded packet data from the recorded MAC address of the access point device 205 with the MAC address of electronic device 200 to generate the swapped packet data.

In addition, the wireless packet may also be, for example, a dynamic host configuration protocol request packet or a dynamic host configuration protocol response packet. For the access point device 205, the electronic device 200 disguises itself as the station device 210 by using the signal booster operation. For the station device 210, the electronic device 200 disguises itself as the access point device 205 by using the signal booster operation. In one embodiment, when a communication signal strength of the electronic device 200 is higher than a communication signal strength of the access point device 205, the electronic device 200 can perform the signal booster operation to disguise itself as the station device 210 and as the access point device 205. Further, in the wireless communication network, a first key negotiated between the electronic device 200 and the access point device 205 is different from a second key negotiated between the electronic device 200 and the station device 210. Further, in the wireless communication network, the electronic device 200 disguises itself as the access point device 205 to communicate with the station device 210 by using one MAC addresses of the access point device 205. The electronic device 200 disguises itself as the station device 210 to communicate with the access point device 205 by using one the MAC addresses of the station device 210.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device used in a wireless communication network and is to be wirelessly connected between an access point device and a station device, comprising:

a receiver circuit, for receiving a wireless packet;

a decryption circuit, coupled to the receiver circuit, for performing a decryption operation upon the wireless packet to generate a decoded packet data;

an address swap circuit, coupled to the decryption circuit, for swapping at least one medium access control address recorded in a medium access control header of the decoded packet data so as to generate a swapped packet data to make the electronic device disguise itself as the access point device or as the station device;

an encryption circuit, coupled to the address swap circuit, for performing an encryption operation upon the swapped packet data to generate an encrypted wireless packet; and a transmitter circuit, coupled to the encryption circuit, for transmitting the encrypted wireless packet.

2. The electronic device of claim 1, wherein the wireless packet is an uplink wireless packet; the address swap circuit is used to swap a medium access control address of the electronic device recorded by a Basic Service Set identification (BSS ID) of the at least one medium access control address in the medium access control header of the decoded packet data into a medium access control address of the access point device to generate the swapped packet data; and, the encryption circuit is used to perform the encryption operation upon the swapped packet data to generate the encrypted wireless packet, and the transmitter circuit is used to transmit the encrypted wireless packet into the access point device.

3. The electronic device of claim 2, wherein the address swap circuit is further used to swap the medium access control address of the electronic device recorded by a destination address of the at least one medium access control address in the medium access control header of the decoded packet data into the medium access control address of the access point device so as to generate the swapped packet data.

4. The electronic device of claim 1, wherein the wireless packet is a downlink wireless packet; the address swap circuit is used to swap a medium access control address of the access point device recorded by a Basic Service Set identification (BSS ID) of the at least one medium access control address in the medium access control header of the decoded packet data into a medium access control address of the electronic device so as to generate the swapped packet data; and, the encryption circuit is used to perform the encryption operation upon the swapped packet data to generate the encrypted wireless packet, and the transmitter circuit is used to transmit the encrypted wireless packet into the station device.

5. The electronic device of claim 4, wherein the address swap circuit is further used to swap the medium access control address of the access point device recorded by a source address of the at least one medium access control address in the medium access control header of the decoded packet data into the medium access control address of the electronic device so as to generate the swapped packet data.

6. The electronic device of claim 1, wherein the wireless packet is a Dynamic Host Configuration Protocol (DHCP) request packet or a DHCP response packet.

7. The electronic device of claim 1, wherein for the access point device, the electronic device disguise as the station device by using a signal booster operation, and for the station device, the electronic device disguise as the access point device by using the signal booster operation.

8. The electronic device of claim 7, wherein when a communication signal strength of the electronic device is higher than a communication signal strength of the access point device in the wireless communication network, the electronic device is used to perform the signal booster operation to disguise itself as the station device and disguise itself as the access point device.

9. The electronic device of claim 7, wherein in the wireless communication network, a first key negotiated between the electronic device and the access point device is different from a second key negotiated between the electronic device and the station device.

10. The electronic device of claim 7, wherein in the wireless communication network, the electronic device uses a medium access control address of the access point device to disguise itself as the access point device to communicate with the station device, and the electronic device uses a medium access control address of the station device to disguise itself as the station device to communicate with the access point device.

11. A method of an electronic device used in a wireless communication network and is to be wirelessly connected between an access point device and a station device, comprising:

providing a receiver circuit to receive a wireless packet;

providing a decryption circuit to perform a decryption operation upon the wireless packet to generate a decoded packet data;

swapping at least one medium access control address recorded in a medium access control header of the decoded packet data so as to generate a swapped packet data to make the electronic device disguise itself as the access point device or as the station device;

providing an encryption circuit to perform an encryption operation upon the swapped packet data to generate an encrypted wireless packet; and using a transmitter circuit to transmit the encrypted wireless packet.

12. The method of claim 11, wherein the wireless packet is an uplink wireless packet, and the swapping step comprises:

swapping a medium access control address of the electronic device recorded by a Basic Service Set identification (BSS ID) of the at least one medium access control address in the medium access control header of the decoded packet data into a medium access control address of the access point device to generate the swapped packet data.

13. The method of claim 12, further comprising:

swapping the medium access control address of the electronic device recorded by a destination address of the at least one medium access control address in the medium access control header of the decoded packet data into the medium access control address of the access point device so as to generate the swapped packet data.

14. The method of claim 11, wherein the wireless packet is a downlink wireless packet, and the swapping step comprises:

swapping a medium access control address of the access point device recorded by a Basic Service Set identification (BSS ID) of the at least one medium access control address in the medium access control header of the decoded packet data into a medium access control address of the electronic device so as to generate the swapped packet data.

15. The method of claim 14, further comprising:

swapping the medium access control address of the access point device recorded by a source address of the at least one medium access control address in the medium access control header of the decoded packet data into the medium access control address of the electronic device so as to generate the swapped packet data.

16. The method of claim 11, wherein the wireless packet is a Dynamic Host Configuration Protocol (DHCP) request packet or a DHCP response packet.

17. The method of claim 11, wherein for the access point device, the electronic device disguise as the station device for the access point device by using a signal booster operation, and for the station device, the electronic device disguise as the access point device for the station device by using the signal booster operation.

18. The method of claim 17, further comprising:

when a communication signal strength of the electronic device is higher than a communication signal strength of the access point device in the wireless communication network, using the electronic device to perform the signal booster operation to disguise itself as the station device and disguise itself as the access point device.

19. The method of claim 17, wherein in the wireless communication network, a first key negotiated between the electronic device and the access point device is different from a second key negotiated between the electronic device and the station device.

20. The method of claim 17, further comprising:

in the wireless communication network, using the electronic device to use a medium access control address of the access point device to disguise itself as the access point device to communicate with the station device and to use a medium access control address of the station device to disguise itself as the station device to communicate with the access point device.

\* \* \* \* \*